Aug. 19, 1941.  W. L. MORRISON  2,253,134
AIR DEFLECTING APPARATUS FOR VEHICLES
Filed April 22, 1933  6 Sheets-Sheet 1
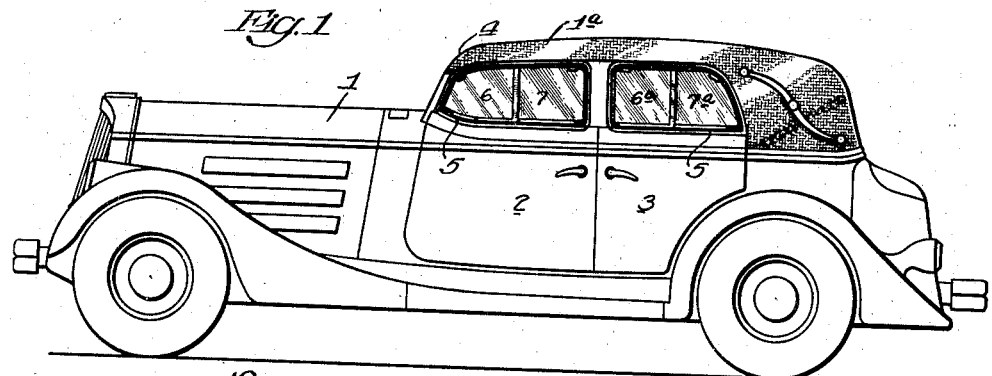
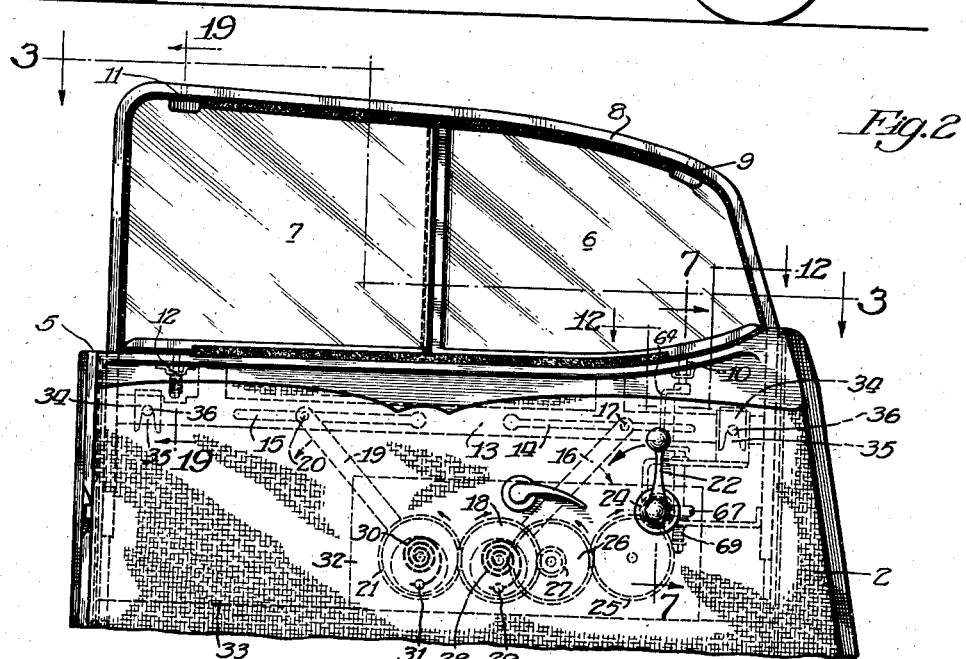
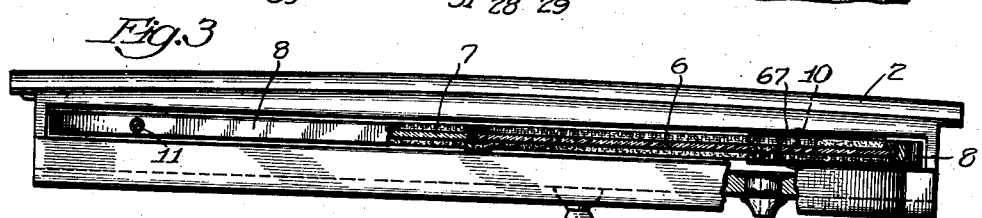
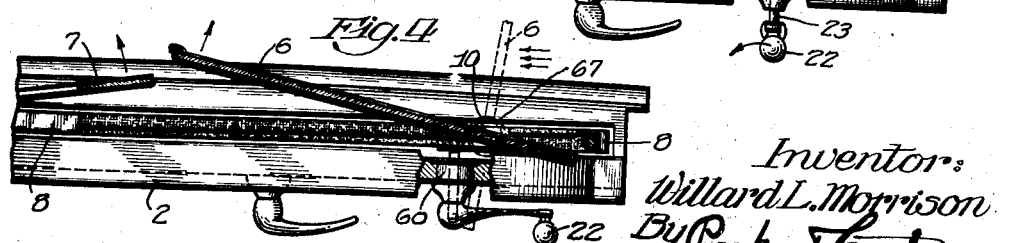
Inventor:
Willard L. Morrison
By Parker & Carter Attys Aug. 19, 1941.　　　W. L. MORRISON　　　2,253,134
AIR DEFLECTING APPARATUS FOR VEHICLES
Filed April 22, 1933　　　6 Sheets-Sheet 2

Inventor:
Willard L. Morrison
By Parker Carter
Attys.

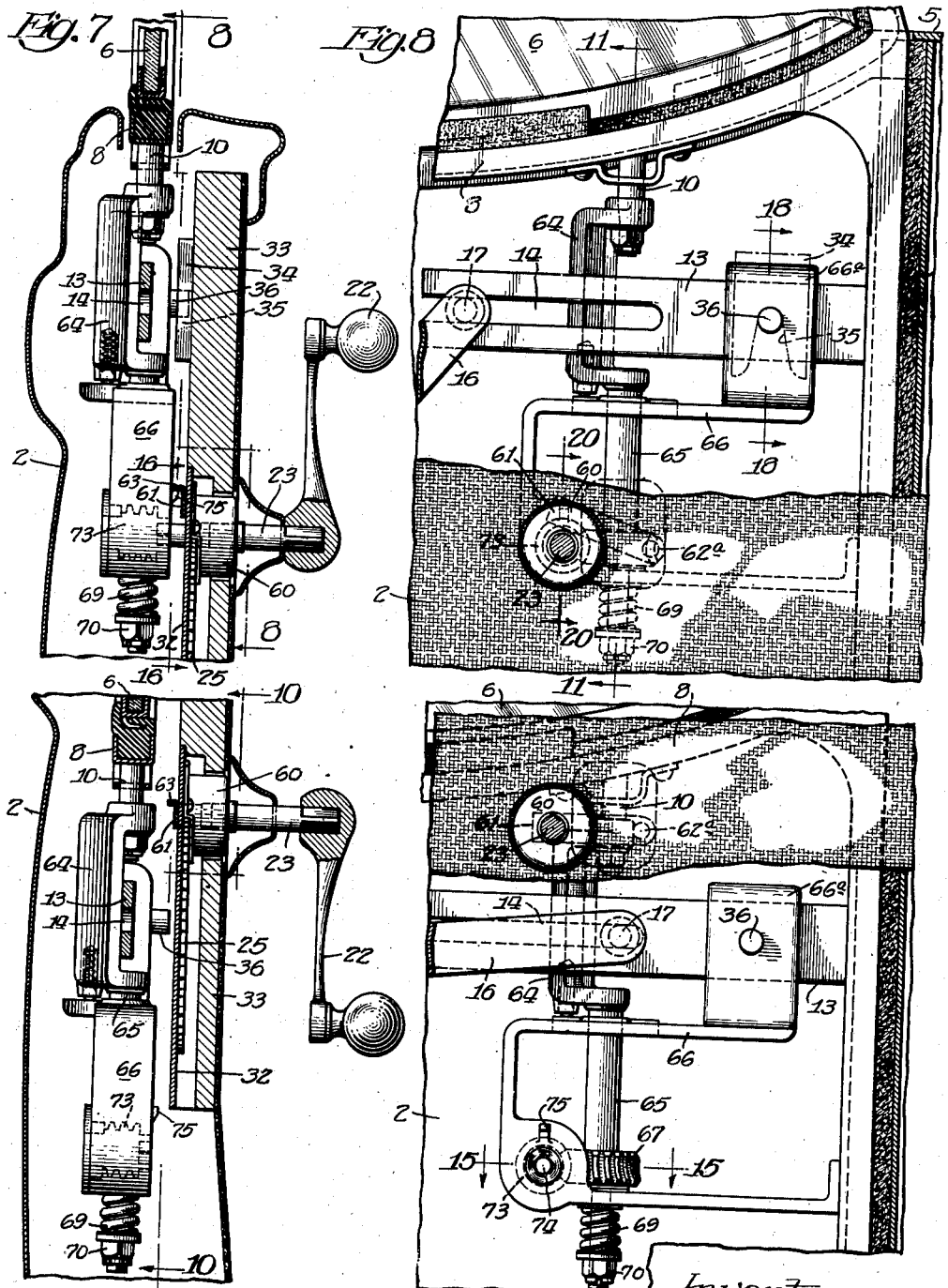

Aug. 19, 1941.  W. L. MORRISON  2,253,134
AIR DEFLECTING APPARATUS FOR VEHICLES
Filed April 22, 1933  6 Sheets-Sheet 4
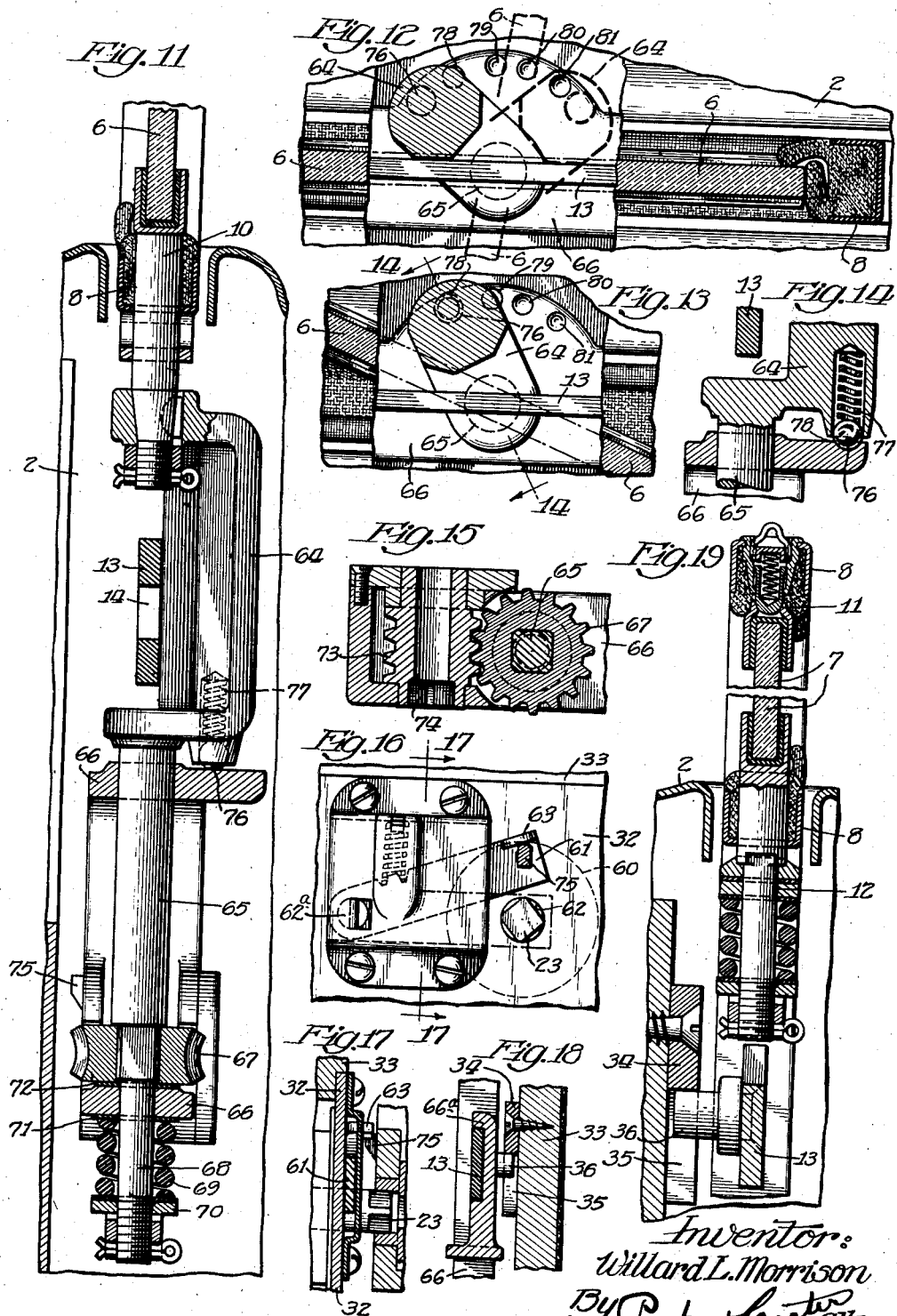
Inventor:
Willard L. Morrison
By Parker & Carter Attys Aug. 19, 1941.   W. L. MORRISON   2,253,134
AIR DEFLECTING APPARATUS FOR VEHICLES
Filed April 22, 1933   6 Sheets-Sheet 5
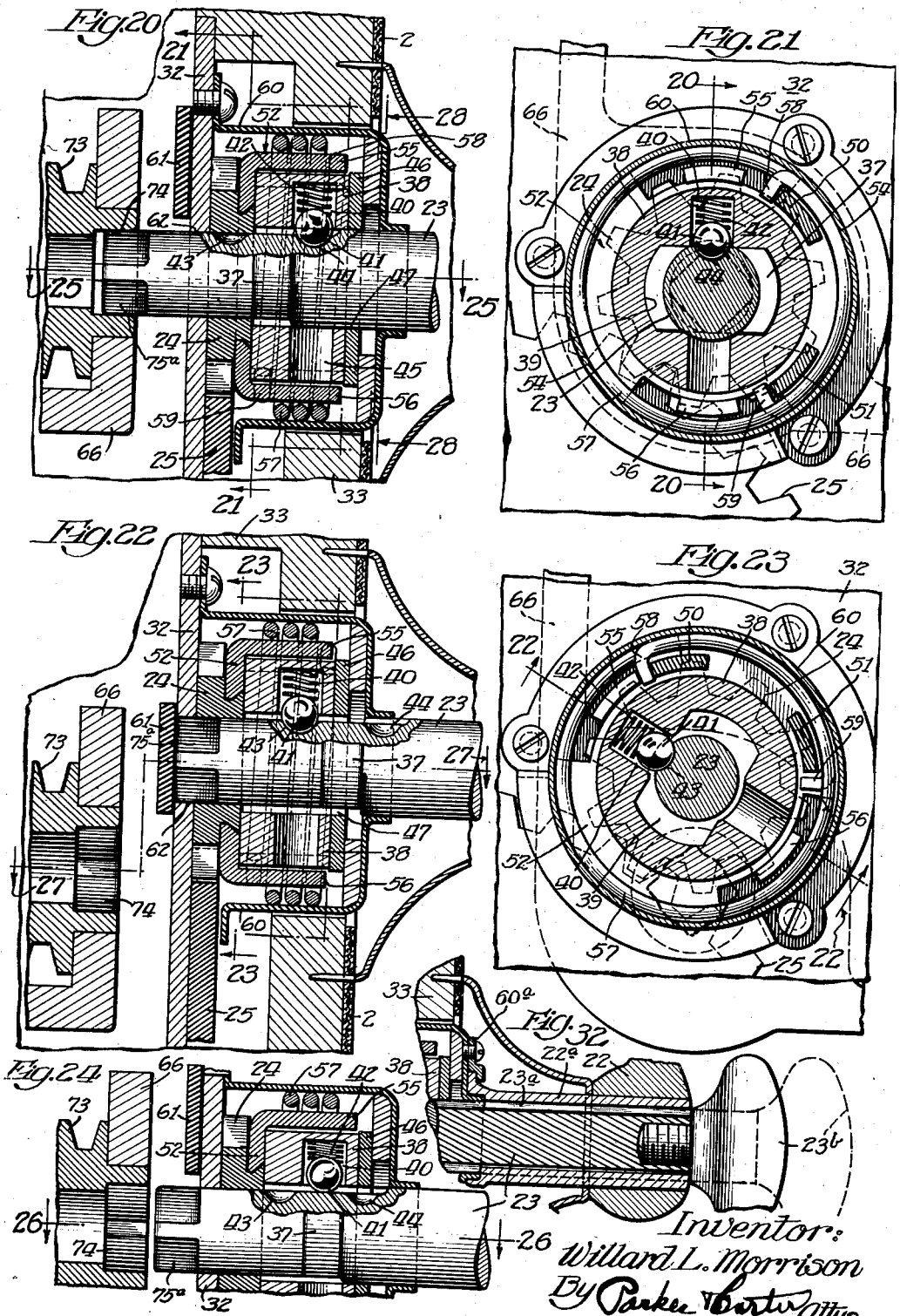

Aug. 19, 1941.  W. L. MORRISON  2,253,134
AIR DEFLECTING APPARATUS FOR VEHICLES
Filed April 22, 1933  6 Sheets-Sheet 6
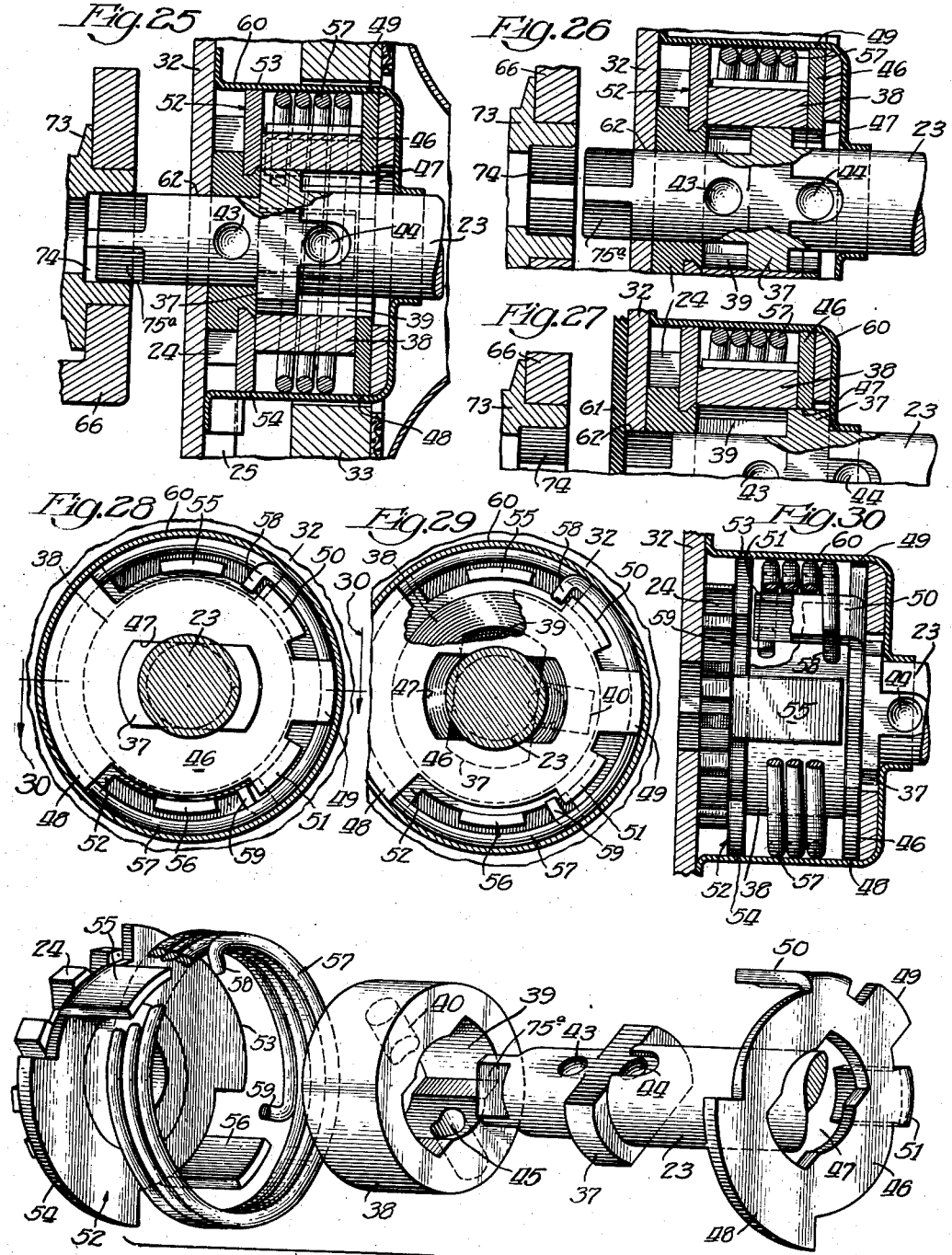

Patented Aug. 19, 1941

2,253,134

UNITED STATES PATENT OFFICE 2,253,134

AIR DEFLECTING APPARATUS FOR VEHICLES

Willard L. Morrison, Chicago, Ill.

Application April 22, 1933, Serial No. 667,409

10 Claims. (Cl. 296—44)

This invention relates to air deflecting apparatus for vehicles and has for its object to provide a new and improved apparatus of this description. The invention has as a further object to provide an air deflecting apparatus particularly adapted for use with moving vehicles for securing proper ventilation of the automobile without draft. The invention has as a further object to provide an air deflecting apparatus particularly adapted for use with a convertible automobile. The invention has as a further object to provide an air deflecting apparatus for automobiles having a transparent deflecting pivoted section with means for raising and lowering the section and means for moving it about its pivot, both means actuated by the same handle. The invention has as a further object to provide the foregoing air deflecting apparatus with means for moving the deflector up and down and about its pivot, said means all located below the bottom of the deflector section. The invention has further objects which are more particularly pointed out in the accompanying description.

Referring now to the drawings, Fig. 1 is a view showing an automobile provided with one form of the deflecting apparatus;

Fig. 2 is an enlarged view of the inside of the door of the automobile with the deflecting apparatus in position;

Fig. 3 is a sectional view taken on line 3—3 of Fig. 2, showing the deflector sections in their closed positions;

Fig. 4 is a view similar to Fig. 3 showing the deflector sections in deflecting positions with parts omitted;

Fig. 7 is an enlarged sectional view taken on line 7—7 of Fig. 2;

Fig. 8 is a sectional view taken on line 8—8 of Fig. 7;

Fig. 9 is a view similar to Fig. 7 with the deflectors lowered;

Fig. 10 is a sectional view taken on line 10—10 of Fig. 9;

Fig. 11 is an enlarged sectional view taken on line 11—11 of Fig. 8;

Fig. 12 is an enlarged sectional view taken on line 12—12 of Fig. 2, with parts broken away;

Fig. 13 is a view similar to Fig. 12 showing the deflector section in deflecting position;

Fig. 14 is a sectional view taken on line 14—14 of Fig. 13;

Fig. 15 is a sectional view taken on line 15—15 of Fig. 10;

Fig. 16 is a sectional view taken on line 16—16 of Fig. 7;

Fig. 17 is a sectional view taken on line 17—17 of Fig. 16;

Fig. 18 is a sectional view taken on line 18—18 of Fig. 8;

Fig. 19 is an enlarged sectional view taken on line 19—19 of Fig. 2;

Fig. 20 is a sectional view taken on line 20—20 of Fig. 21;

Fig. 21 is a sectional view taken on line 21—21 of Fig. 20;

Fig. 22 is a sectional view taken on line 22—22 of Fig. 23;

Fig. 23 is a sectional view taken on line 23—23 of Fig. 22;

Fig. 24 is a view similar to Fig. 22 with the operating shaft in neutral position and with parts broken away;

Fig. 25 is a sectional view taken on line 25—25 of Fig. 20;

Fig. 26 is a sectional view taken on line 26—26 of Fig. 24;

Fig. 27 is a section taken on line 27—27 of Fig. 22;

Fig. 28 is a sectional view taken on line 28—28 of Fig. 20;

Fig. 29 is a view similar to Fig. 28 with the parts in a different position;

Fig. 30 is a sectional view taken on line 30—30 of Fig. 28;

Fig. 31 is a perspective view of the several parts of the actuating mechanism for the deflector sections, the parts being spread out so that the construction may be easily understood;

Fig. 32 is a view showing a modified form of handle and shaft construction.

Like numerals refer to like parts throughout the several figures.

Figure 5:
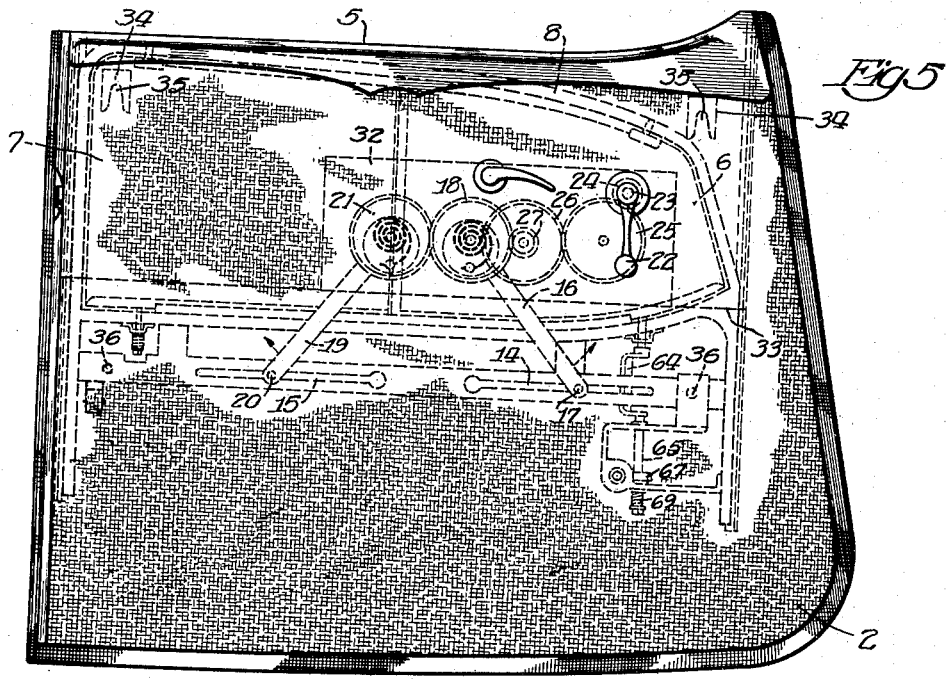
Fig. 5 is a view of the inside of the door with the deflectors moved down into the recess of the door.

The invention may be applied to an automobile having either two doors or four doors. In the drawings I have illustrated an automobile with four doors.

Referring now to the drawings, there is illustrated in Fig. 1 an automobile 1 of the convertible type. In this construction the doors 2 and 3 do not extend up to the top 4, but end at the point 5.

In carrying out my invention, I provide above the front door the air deflector sections 6 and 7 made of transparent material, as of glass. These sections are pivotally mounted in a frame 8.

The front section 6 is pivoted at 9 and 10 to the frame, the pivotal points 9 and 10 being at a distance from the front edge of the deflector section and at points between the center portion of the section and the front edge, preferably at about the positions indicated in the drawings. The rear deflector section 7 is pivoted at 11 and 12 to the frame, the pivot points being near the rear of said section, as illustrated in Fig. 2.

When used in the ordinary way for air deflecting purposes, the front section 6 has its rear end moved outwardly and the rear section 7 has its front end moved outwardly, but not as far out as the rear end of the front section. When the car is moving, this causes the current of air to strike the front section and be deflected around the open space between the two sections so as not to enter said space, but to at the same time produce a suction which draws air out of the body of the automobile, thus producing ventilation without drafts. To secure the best results the front section 6 should be of considerable length, the best results being secured when it is about half the length of the entire window. When the automobile has a rear door there is preferably used above the rear door two similar air deflector sections 6a and 7a pivoted in substantially the same manner so that they may be arranged to produce a similar deflecting and ventilating effect without drafts. In this convertible car the top 1a may be of any of the usual constructions so that it may be moved back out of the way when desired.

Figure 6:
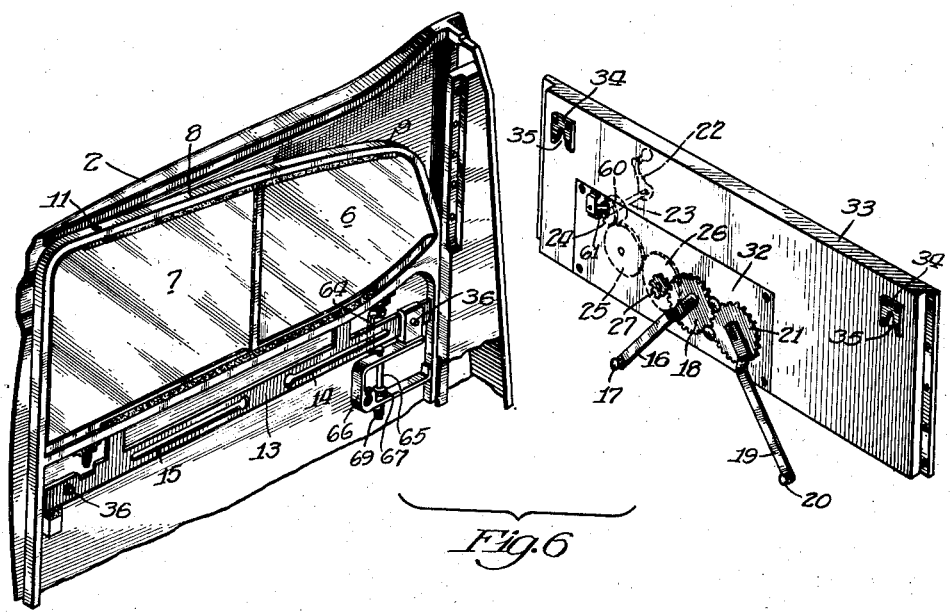
Fig. 6 is a perspective view showing the door with the gear carrying panel moved out to show the various parts of the apparatus.

The door 2 is provided with a recess or chamber or receiving space into which the frame 8 and the deflector sections may be moved. The frame 8 and the deflector sections 6 and 7 are supported from the bottom and a mechanism is provided for lowering the entire frame into the space in the door and for lifting it out of this space to the position shown in Figs. 1 and 2. In the particular construction illustrated the frame 8 has attached to its bottom a member 13, see Figs. 2 and 6, provided with the slots 14 and 15. An arm 16 has a crank 17 which works in the slot 14. The arm 16 is connected to a toothed wheel or gear 18 which is rotatably mounted on the door. A second arm 19 has a crank 20 which works in the slot 15. The arm 19 is connected to the toothed wheel or gear 21 rotatably mounted on the door. The gears 18 and 21 have their teeth in engagement. These gears are rotated by means of a handle 22 accessible from the inside of the automobile. This handle is connected with a shaft 23 which carries a pinion 24 which engages a gear 25 which in turn engages a gear 26. On the shaft of the gear 26 is a pinion 27 which engages the teeth of the gear 18. Associated with the gear 18 is a coil spring 28 which has one end fastened to the gear shaft and the other end fastened at 29 to a fixed part. The gear 21 is provided with a similar spring 30 which has one end fastened to the gear shaft and the other end fastened at 31 to a fixed part. These springs are counterbalanced springs for counterbalancing the weight of the air deflector sections and associated parts.

In the particular construction illustrated these gears are mounted on a plate 32, see Fig. 6, which is in turn connected with a part 33 fastened to the door. It will be noted that by rotating the handle 22 in one direction the deflector sections and frame 8 will be moved downwardly into the recess in the door, as shown in Fig. 5, and that when the handle 22 is rotated in the opposite direction the deflector sections and frame 8 will be moved upwardly to their operative positions, as shown in Fig. 2. It will be noted that this part 33 has the stop members 34 with notches 35. The member 13 is provided with pins 36. When the deflector sections and frame 8 are lifted to the maximum up position the pins 36 enter the notches 35 and when they engage the stop members 34 the upward movement of the window is stopped. These stop members, therefore, limit the maximum up position to which the deflector sections may be moved and properly position the device for receiving the crankshaft.

Some means is provided for rocking or rotating the front section 6 about its pivotal points 9 and 10. I prefer to provide an arrangement whereby the same handle used to raise and lower the deflector sections may also be used to move the deflector section 6 about its pivotal connection so as to move it to its deflecting positions. I also prefer to arrange this actuating mechanism for the deflector sections so that the deflectors cannot be pushed down by hand. In other words, the actuating mechanism also locks the deflector sections in place. Such a construction is illustrated herein. When the same handle is used for both purposes, the pinion 24 is loose on the shaft 23. The shaft 23 is slidable longitudinally so that it may be slid from the position shown in Fig. 22, for example, to that shown in Fig. 20. This shaft has fastened to it, or integral with it, a connector element 37 which preferably projects laterally in opposite directions from the shaft, as shown in Fig. 31. Fig. 22 shows the position of the shaft 23 when it is being used to lift and lower the deflector sections. Fig. 20 shows the shaft 23 in position where it is disconnected from the raising and lowering mechanism and connected with the mechanism which moves the deflector section about its pivotal points.

Some means is provided for locating these positions and holding the shaft in these positions when endwise pressure thereon is released. In the construction shown this is accomplished by providing a locating member 38 which has an opening 39 therethrough, see Fig. 31, of substantially the shape of the connector element 37. This locating member is slidable on the shaft and the connector element and is provided with a recess 40 into which is received a shaft engaging member 41, shown as a ball, which is pressed by a spring 42 toward the shaft. The shaft is provided with the recesses 43 and 44, into one of which the ball is received. In order to easily make the recess 40 a hole 45 is bored into the member 38, but not quite therethrough so as to leave a bottom to the recess 40. Mounted on the shaft 23 is a disc 46 which has an opening 47 the shape of the connector element 37, so that when the connector element is in the opening the disc 46 will rotate with the shaft, and when it is out of the opening the shaft rotates free of the disc. The disc is provided with the extended peripheral portions 48 and 49. The disc is also provided with the spring engaging members 50 and 51 which project inwardly therefrom. The pinion 24 is provided with a similar disc 52 which has the projecting peripheral portions 53 and 54, and which also has the laterally extended spring engaging members 55 and 56. Surrounding the locating member 38 and the spring engaging members 50, 51, 55, and 56 is a coil spring 57. The ends of these springs are bent inwardly to form the bent portions 58 and 59. The spring is confined between the projecting peripheral portions 48 and 49 of the disc 46, and 53 and 54 of the disc 52, as clearly shown in Figs. 25 and 26. When the parts are assembled the bent portion 58 of the spring is located between the spring engaging part 50 of the disc 47 and the spring engaging part 55 of the disc 52, see Fig. 23. The bent end 59 of the spring 57 is located between the spring engaging part 51 on the disc 46 and the spring engaging part 56 on the disc 52.

When the handle 22 is operatively connected with the pinion 24 so that when it is rotated it will raise or lower the deflector sections and their frame, these spring engaging parts engage the bent ends of the spring 57 so as to tend to wind up the spring and prevent it from engaging the casing 60 surrounding it. If it is attempted to lower the deflector sections without turning the handle, that is by applying pressure to them, these spring engaging parts engage the bent ends of the spring so as to tend to uncoil it and cause it to engage the casing 60, thereby acting as a brake to prevent the deflector sections from being pushed down. While the handle and shaft is being used to raise or lower the deflector sections, a stop 61 covers the opening 62 in the plate 32 so that the shaft 23 cannot be pushed therethrough. This stop is illustrated in Fig. 16, and it will be noted that it is pivoted at 62a and that it has a lug 63 thereon.

The pivot 10 of the front deflector section 6 has connected therewith a U-shaped member 64, see Figs. 7 to 11, which rotates with the pivot 10. This U-shaped member passes around the bar 13, and there is connected with it a pivot member 65 which is in line with the pivot 10. The pivot member 65 is rotatably mounted in a frame 66 which is attached to the bar 13 by the member 66a, see Figs. 8 and 9, and which moves up and down with it. Connected with the pivot member 65 is a worm gear 67 which is shown as mounted on a non-circular portion of the pivot member so as to turn it when rotated. The pivot member has a portion 68 which projects below the frame 66. There is a spring 69 surrounding the part 68 and a nut 70 which can be screwed up to press the spring against the frame 66. There are preferably friction washers 71, and 72 on opposite sides of the lower part of the frame 66, see Fig. 11, so that when the nut 70 is tightened there will be a friction on the pivot so as to resist its turning and thereby permit the deflector section to be held in any desired position. The parts 10, 64 and 65 may all together be said to form the complete pivot for the deflector section.

The worm gear 67 is engaged by a worm 73, see Figs. 10 and 15, which is mounted in the frame 66. The worm 73 is provided with a non-circular opening 74. The frame 66 is provided with a projection 75 which, when the deflectors are raised to their maximum up position, engages the projection 63 on the plate 61 and which lifts the plate away from the opening 62 in the plate 32, as shown in Figs. 7 and 20. The shaft 23 may now be pushed longitudinally through the hole 22, its non-circular end 75a entering the non-circular opening 74 in the worm 73. The locating member 41 is then moved from the recess 43 to the recess 44 in the shaft 23. The member 37 on the shaft 23 is disconnected from the disc 46 so as to disconnect the shaft from the pinion 54, and hence from the raising and lowering mechanism. The handle and shaft 23 may now be rotated, and this will rotate the worm gear 67 and the pivot members 65 and 10 and rotate the front deflector section 6 about its pivot so as to move it to its deflecting position.

The U-shaped member 64 is made of such size that it strikes the member 13 so as to limit the outward movement of the deflector section 6. It also, when moved in the other direction, engages the member 13 so as to limit the inward movement of the deflector section 6. The U-shaped member 64 is provided with a locating device by means of which the deflector section can be located in any desired position. As herein shown, this locating device consists of a member 76, see Figs. 11 and 14, which is in a recess and which is pressed downwardly by a spring 77. This member enters recesses 78, 79, 80 and 81 in the frame member 66 so that the deflector section may be moved and held in various positions. The operator can tell when the member 76 passes into one of these recesses, and he will know when to stop turning the handle to maintain the deflector section in any desired position.

When it is desired to again lower the deflector section the handle and shaft are moved outwardly so as to disconnect the shaft from the worm 73 and bring the locating member 41 into the recess 44 of the shaft 23. This also brings the member 37 into the opening 47 in the disc 46 and connects the shaft 23 with the raising and lowering mechanism. It will be seen that in this construction the same handle is used to raise and lower the deflectors, and to also move the front deflector about its pivots to any desired angular position. It will further be seen that this mechanism is located below the bottom of the deflector sections.

It will be noted that the slots in the stops 34 are enlarged at the bottom and have inclined sides converging toward the upper end, the upper ends being just sufficient to receive the pins 36. These stops and pins are so positioned and constructed that they not only limit the maximum up position, but they insure the parts being always moved to a position, when in their maximum up position, so that the opening 74 in the worm 73 registers with the opening 62 and the end of the shaft 23 so that when said shaft is moved its end will enter the opening 74. These stops 74, therefore, act not only as stops, but as positioning devices for correctly positioning the parts when it is desired to move the deflector about its pivot by means of the handle.

Instead of having the handle 22 connected directly to the shaft 23, I may have it connected with a sleeve 22a, see Fig. 32. This sleeve surrounds the shaft 23, the shaft having a slidable connection therewith by means of a spline or key 23a. The sleeve 22a has a shoulder on its end which fits under a confining device 60a so that the hand and sleeve may be rotated, but cannot be moved longitudinally. The shaft 23 projects from the sleeve 22a and is preferably provided with a hand piece 23b by means of which it may be moved in and out. With this construction, when the deflectors are in their maximum up position the shaft 23 is pushed inwardly by grasping the hand piece 23b so that the end of the shaft enters the opening 74 in the worm 73. Because of the spline the shaft is rotated in any position in which it is moved. It will be seen that by this construction, while the shaft may be moved longitudinally, the handle 22 and the sleeve 22a cannot be moved longitudinally. This is really the preferred construction, as it prevents any binding of the shaft 23 as might occur when the handle is directly connected with the shaft and the shaft is moved longitudinally by the handle. It will further be seen that when the deflectors are moved to their ventilating positions the space between their adjacent edges forms a vent through which air from the vehicle is drawn when the vehicle is in motion, and this vent may be turned a sheltered vent as the front deflector section when in the proper position causes the air to jump across the vent without entering it. It will also be seen that the deflector sections when moved to their up positions are automatically locked in these positions and cannot be moved downwardly from the outside of the car, it being necessary to rotate the handle. When the front deflector section, for example, is moved to the position shown in dotted lines in Fig. 4 it acts as a scooping device for scooping air into the vehicle.

I claim:

1. An air deflecting apparatus for vehicles, comprising a frame, an air deflector section pivotally mounted in said frame, a support for said frame connected with the bottom thereof, a receiving space into which said frame and deflector section may be moved, a controlling mechanism located below said frame and deflector section for raising and lowering them, a handle for operating said controlling mechanism, a deflector moving mechanism for moving said deflector about its pivotal connection, said deflector moving mechanism located below the deflector section, said handle being connected with the controlling mechanism when it is desired to raise or lower the deflector section, and means for disconnecting said handle from said controlling mechanism and connecting it with said deflector moving mechanism when it is desired to move the deflector about its pivotal connection, said means comprising a longitudinally movable shaft connected with said handle, and a clutch mechanism rendered inoperative when the shaft is moved into engagement with the deflector moving mechanism and operative when the shaft is moved out of operative relation with said deflector moving mechanism.

2. An air deflecting apparatus for vehicles, comprising a frame, an air deflector section pivotally mounted in said frame, a support for said frame connected with the bottom thereof, a receiving space into which said frame and deflector section may be moved, a controlling mechanism located below said frame and deflector section for raising and lowering them, a handle for operating said controlling mechanism, a deflector moving mechanism for moving said deflector about its pivotal connection, a single handle for operating said controlling mechanism and said deflector moving mechanism, a longitudinally movable shaft connected with said handle, the longitudinal movement of which disconnects the handle from said controlling mechanism and connects it with said deflector moving mechanism, a stop for preventing the longitudinal movement of said shaft, and a part moved by the said controlling mechanism for rendering said stop inoperative.

3. An air deflecting apparatus for vehicles, comprising a pivoted deflector section, a pivot connected therewith at a point intermediate its front and rear edges and projecting below the deflector section, a longitudinally movable shaft, a handle for rotating said shaft, and means for moving said shaft to connect it with and disconnect it from said pivot at a point below said deflector section so as to rotate said pivot, the pivot acting as the power transmitting connection between the shaft and the deflector section, and pivotally move said deflector section.

4. An air deflecting device for automobiles, comprising a deflector section having a pivot connected therewith, a frame member at the bottom of said deflector section and through which said pivot projects, raising and lowering mechanism for said deflector section, a rotatable and longitudinally movable shaft, and means for connecting said shaft with said raising and lowering mechanism when it is in one position and for connecting it to the said pivot to rotate said pivot, when it is in another position.

5. A structure of the character described, comprising a vertically-slidable frame, a window mounted for swinging movement in the frame, mechanism to slidably operate the frame, mechanism to swingably operate the window, a shaft associated with the first mechanism, a second shaft associated with the second mechanism, and a longitudinally slidable control handle selectively engageable with the said shafts.

6. A structure of the character described, comprising a vertically-slidable frame, a window mounted for swinging movement in the frame, mechanism to slidably operate the frame, mechanism to swingably operate the window, a shaft associated with the first mechanism, a second shaft associated with the second mechanism, and a longitudinally slidable control handle selectively engageable with the said shafts, the said control handle being normally in engagement with one of said shafts.

7. A window for vehicles comprising a vertically sliding window frame, mechanism for raising and lowering said frame, a glazed frame pivotally supported in the sliding frame to swing on a vertical axis, mechanism for turning the swinging frame on its axis, when the sliding frame is in fully raised position, a slidable control handle, means for connecting said handle with one of said mechanisms, and means for connecting said handle with the other of said mechanisms.

8. A window for vehicles comprising a vertically sliding window frame, mechanism for raising and lowering said frame, a frame pivotally supported in the sliding frame to swing on a vertical axis, mechanism for turning the swinging frame on its axis, when the sliding frame is in fully raised position, said mechanisms including a common longitudinally slidable handle, adapted when in one position to control the raising and lowering mechanism, and when in another position to control the turning mechanism.

9. An air deflecting device for convertible automobiles having a windshield, comprising a double-walled door with its upper edge substantially in alignment with the bottom of the windshield, a rigid frame, a glass section mounted in said frame, the frame entirely surrounding said glass section and forming the only support therefor, separated guiding members connected with said glass section, stationary guiding members on said door cooperating with said guiding members on the glass section, and lowering and raising mechanism for lowering said frame in between the double walls of said door, so that the top of said frame is substantially in alignment with the top of said door, and for lifting said frame and glass section upwardly so as to project above the top of said door, the top of said frame and the top of said glass section being in the same relative position with relation to each other in all the various up and down positions of said frame and glass section cooperating bracing members connected with said door and with said glass section and located intermediate the guiding members on the glass section, brought into engagement when the glass section is in its up position to act to brace the glass section and prevent rattling thereof.

10. An air deflecting device for convertible automobiles having a windshield, comprising a double-walled door with its upper edge substantially in alignment with the bottom of the windshield, an air deflecting device comprising a rigid frame, a pivoted air deflecting section pivotally mounted in said frame, the frame entirely surrounding said deflecting section and forming the only support therefor, lowering and raising mechanism for lowering said frame in between the double walls of said door, so that the top of said frame is substantially in alignment with the top of said door, and for lifting said frame and deflecting section upwardly so as to project above the top of said door, the top of said frame and the top of said deflecting section being in the same relative position with relation to each other in all the various up and down positions of said frame and deflecting section, and means on said door below said pivoted deflecting section, when it is in its up position, for limiting its upward movement said means also acting to brace the deflecting section and assist in maintaining it against rattling when in its up position.

WILLARD L. MORRISON.